United States Patent [19]
Crosby, Jr.

[11] 4,102,519
[45] Jul. 25, 1978

[54] VARIABLE LIFT INFLATABLE AIRFOIL FOR TETHERED BALLOONS

[75] Inventor: Edward L. Crosby, Jr., Indialantic, Fla.

[73] Assignee: The United States of America as represented by the Secretary of the Air Force, Washington, D.C.

[21] Appl. No.: 795,822

[22] Filed: May 11, 1977

[51] Int. Cl.² .............................................. B64B 1/42
[52] U.S. Cl. ..................................... 244/125; 244/33; 244/123; 244/219
[58] Field of Search ................... 244/125, 123, 30, 31, 244/33, 219, 25, 5, 126, 127, 128, 24

[56] References Cited
U.S. PATENT DOCUMENTS

| 1,288,451 | 12/1918 | Smyth | 244/33 |
| 1,376,121 | 4/1921 | Smyth | 244/33 |
| 2,616,509 | 11/1952 | Thomas | 244/123 X |
| 3,871,603 | 3/1975 | Menke | 244/31 |

Primary Examiner—Barry L. Kelmachter
Attorney, Agent, or Firm—Joseph E. Rusz; Jacob N. Erlich

[57] ABSTRACT

A variable lift inflatable airfoil for tethered balloons having a horizontal fin made up of two inflatable chambers. The primary or lower chamber is normally maintained at a greater pressure than the secondary or upper chamber. Proper inflation and deflation of the secondary chamber will stabilize the pitch attitude of the balloon at some desirable low, positive angle for any wind velocity.

7 Claims, 5 Drawing Figures

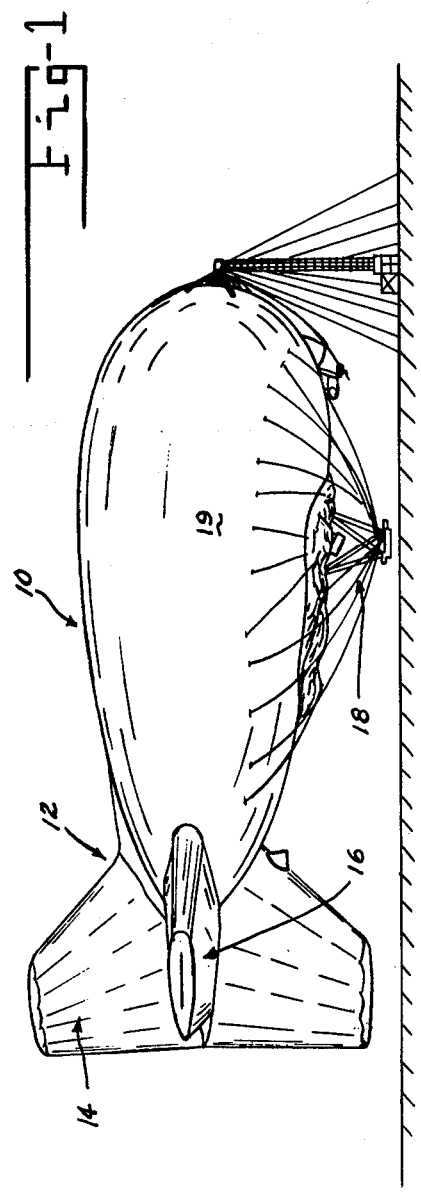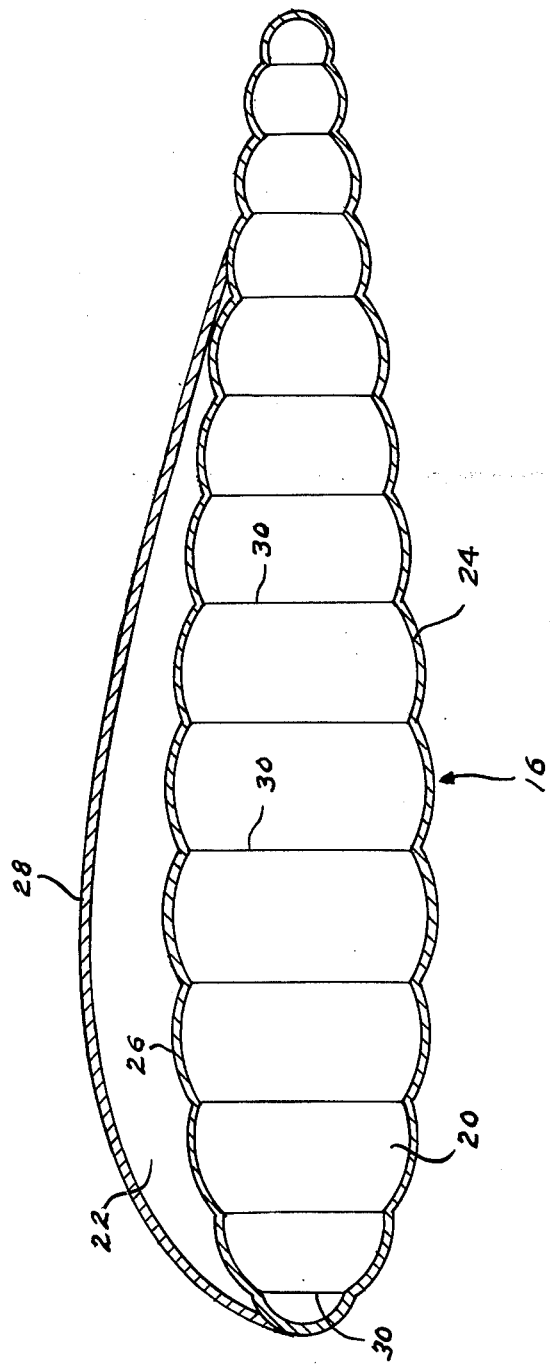

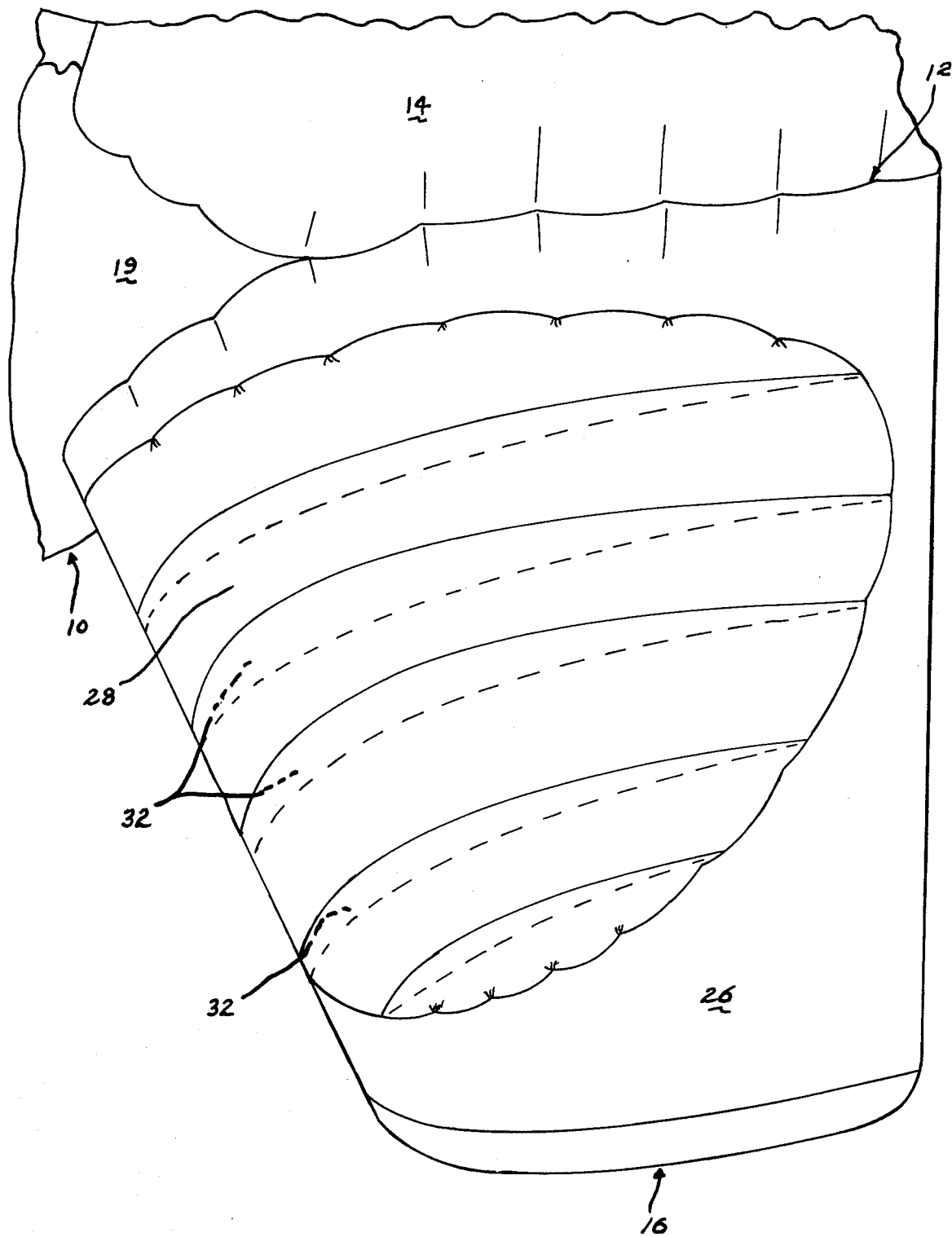

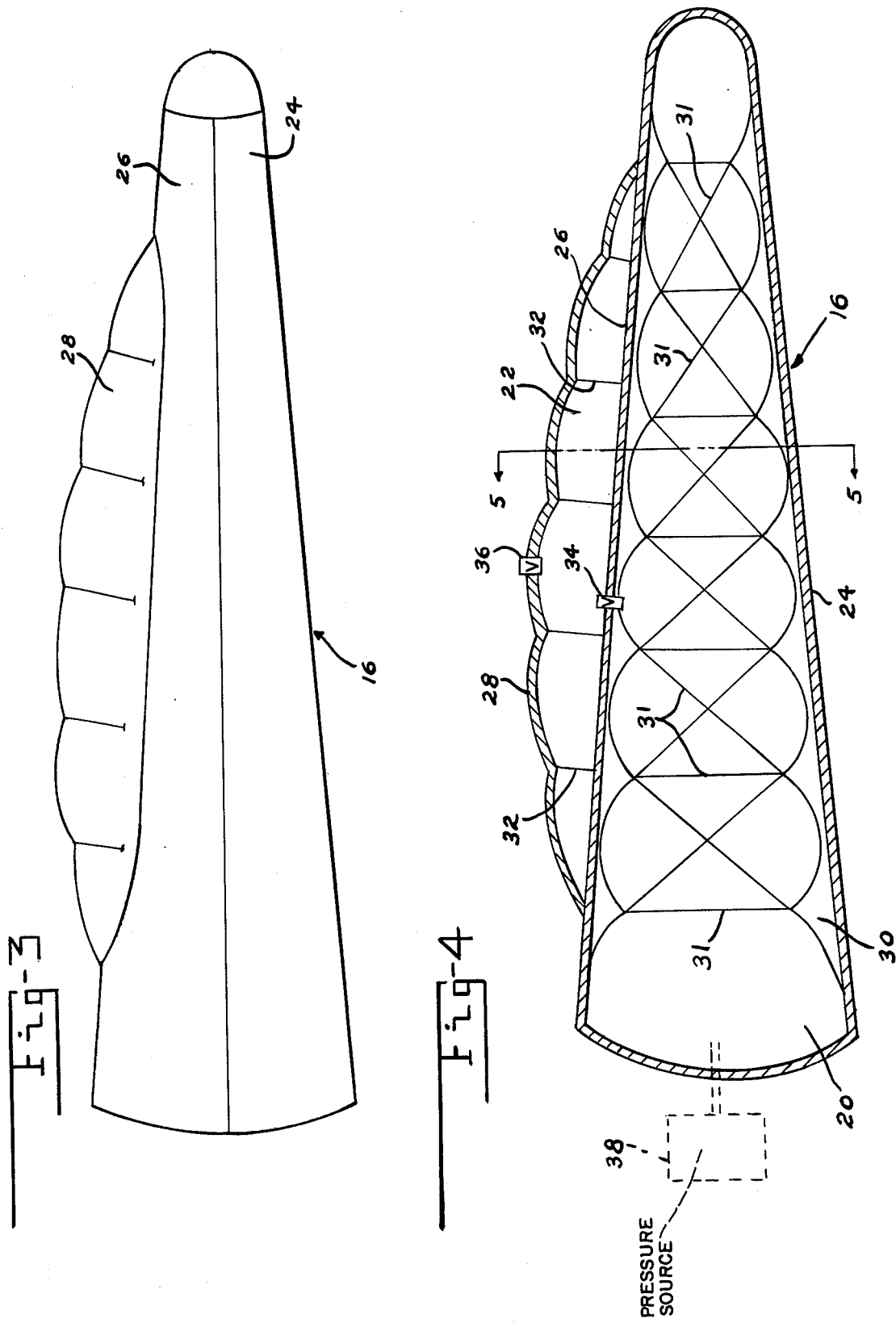

VARIABLE LIFT INFLATABLE AIRFOIL FOR TETHERED BALLOONS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to tethered balloons, and, more particularly, to a variable lift inflatable airfoil structure for use therewith.

In rigid airfoils such as wings and horizontal stabilizers of conventional aircraft, variable lift is provided by hinged extensions of the airfoil in which the angle of articulation is mechanically adjusted to provide the lift characteristics desired. These airfoils are commonly called ailerons and elevators.

In lighter than air aircraft, such as ballons, however, since they are generally of an inflatable fabric construction it is not possible to provide these crafts with "conventional" variable airfoil structures because: (1) the high forces required to drive the small moment arms of the movable part of the airfoil cannot be supported by the soft inflatable structure of both the fixed and movable parts, and (2) the use of stiff metallic structure to accomplish the purposes set forth hereinabove would be too heavy to be practical in such lighter than air aircraft and would also be destructive to the soft inflated structure.

In dirigibles some elevators and rudders have been utilized by the attachment thereof to the reinforced section of the dirigible. This is possible because these elements in the form of fins are small, are not inflated structures and basically the forces developed are also small. Dirigibles, however, basically involve a different stability and flight regime than lighter than air tethered balloons. In addition, dirigibles are pitch-neutral and are in free flight, whereas a tethered balloon is pitch-positive and restrained similar to a kite. It would be extremely desirable to utilize variable lift airfoil structures on tethered balloons. Unfortunately, the airfoil structures heretofore discussed would cause greater problems to the tethered balloon flight than would be solved by their addition thereto.

Generally tethered balloons utilize fins which develop zero lift at zero angle-of-attack because the airfoil structures associated therewith are symmetrical. The symmetrical airfoil structure at zero incidence has equal aerodynamic pressure on both upper and lower surfaces thereof and therefore does not develop any lift at zero angle-of-attack. Conversely, if the airfoil were made unsymmetric in section and if the asymmetry were of a desirable configuration, such a structure would only develop lift at zero-angle-of-attack. Such a fixed structure, however, although effective under certain circumstances, would not be particularly useful because the lift characteristic would remain fixed. Furthermore, such an unsymmetrical airfoil utilizes conventional chordwise ribs in its construction, which in itself leads to two additional problems: (1) because of Pascal's Law the shape would be as desired only at the rib sections and would be nearly symmetrical at stations midway between ribs unless an intolerably large number of ribs were used and (2) inflated airfoils which are shape-determined by chordwise ribs have poor shear stability and therefore inferior stiffness to cantilever bending.

It is therefore obvious that there is a great need for variable lift capability in tethered balloon design. However, as set forth above utilization of conventional variable lift design results in greater drawbacks to the overall balloon efficiency than the benefits derived therefrom.

SUMMARY OF THE INVENTION

The instant invention provides a variable lift inflatable airfoil structure for use with tethered balloons. This structure overcomes the problems set forth in detail hereinabove.

In present practice it is customary to utilize symmetrical-section fins with tethered balloons and to trim the rigging of the balloon so it flies at positive-pitch attitude (10° or 12°) in light wind. As the velocity of the wind increases, the angle of attack of the fins causes induced lift and the pitch angle reduces to approach some small value (1° or 2°). It is difficult to correctly maintain tethered balloons in flight because one has to set the initially rigged pitch to a value from which the maximum expected wind velocity will not cause the pitch to go past zero.

In order to alleviate this problem, the instant invention sets forth an airfoil structure which is made up of a pair of inflatable chambers which adds correctly proportioned thickness to the upper side of a horizontal fins and thus, provides lift at zero angle-of-attack and increases induced lift at positive angle-of-attack.

The airfoil structure of a tethered balloon is generally made up of a pair of vertical and a pair of horizontal fins. The horizontal fins, in this instance, provide the variable lift capability of the instant invention. This airfoil structure is generally considered the tail section of an elongated conventional tethered balloon.

Since each of the pair of horizontal fins making up the airfoil are identical in construction, this invention describes with specificity only one such fin. With this invention, the fin is constructed of a primary chamber having upper and lower air retaining skin-like members or membranes and which are generally symmetrical in configuration. Attached to the outer surface of the upper membrane of the primary chamber is another air retaining membrane which forms with the upper membrane of the primary chamber a secondary or lift chamber. The lift chamber can be inflated and deflated in accordance with the variable airfoil capability of this invention.

The primary chamber maintains proper air pressurization through conventional means while the secondary or lift chamber is pressurized from the primary chamber by, for example, any conventional electrically operated valve. The airfoil, at maximum inflation, because of its asymmetry develops positive lift at zero angle-of-attack. In order to decrease this lift, air is evacuated from the secondary or lift chamber thereby decreasing the asymmetry thereof and develops zero lift at zero angle-of-attack.

The variable lift horizontal fins of this invention when used for the horizontal fins of a tethered balloon will permit the balloon to fly near zero pitch attitude for any wind velocity. The variable lift may be commanded by telemetry or may be driven by a servo mechanism which uses deviations from an established pitch, derived from an on-board pitch attitude sensor (such as a gyro) for the error signal.

It is therefore an object of this invention to provide an airfoil structure for tethered balloons which is capable of producing variable lift.

It is another object of this invention to provide a variable lift airfoil structure for tethered balloons which is inflatable.

It is still another object of this invention to provide a variable lift inflatable airfoil structure for tethered balloons which has an extremely light weight.

It is a further object of this invention to provide a variable lift inflatable airfoil structure for tethered balloons which is economical to produce and which utilizes conventional currently available components that lend themselves to standard mass producing manufacturing techniques.

For a better understanding of the present invention, together with other and further objects thereof, reference is made to the following description taken in connection with the accompanying drawing and its scope will be pointed out in the appended claims.

DESCRIPTION OF THE DRAWING

FIG. 1 is a pictorial respresentation of a tethered balloon with the variable lift inflatable airfoil of this invention mounted thereon;

FIG. 2 is a pictorial representation of one of the horizontal fins of the variable lift inflatable airfoil of this invention;

FIG. 3 is a side elevational view of one of the horizontal fins of the variable lift inflatable airfoil of this invention;

FIG. 4 is a side elevational view of one of the horizontal fins of the variable lift inflatable airfoil of this invention, shown partly in cross-section; and FIG. 5 is a cross-sectional view taken along line 5—5 of FIG. 4 of one of the horizontal fins of the variable inflatable airfoil of this invention.

DETAILED DESCRIPTION OF THE PREFERRED EMBODIMENT

Reference is now made to FIG. 1 of the drawing which shows in pictorial fashion a tethered balloon 10 which has mounted on the rear portion thereof the inflatable airfoil 12 of the instant invention. Airfoil 12 is made up of a pair of vertical fins 14 and a pair of horizontal fins 16. Although the instant invention is applicable to both sets of fins 14 and 16, this invention primarily applies to the construction of horizontal fins 16. In addition to fins 14 and 16, balloon 10 also contains thereon payload equipment 18 as well as other conventional tethered balloon apparatus. FIG. 2 of the drawing specifically shows one such fin 16 mounted upon the rear portion of body 19 of tethered balloon 10 with vertical fin 14 also mounted thereto.

Reference is now made to FIGS. 2, 3, 4 and 5 of the drawing which best show the specific construction of airfoil 12, and particularly fin 16 of the instant invention. Fin 16 is made of a primary chamber 20 and a secondary or lift chamber 22 mounted thereon. Chamber 20 is defined by a pair of upper and lower non-rigid, gas retaining skin-like members or membranes 24 and 26, respectively, while secondary or lift chamber 22 is defined by membrane 26 and gas retaining non-rigid member or membrane 28 which is attached to the outer surface of membrane 26. Although chambers 20 and 22 may be filled with any suitable gas, generally the instant invention utilizes air as the gas for inflating chambers 20 and 22. Membranes 24, 26 and 28 are made of any conventional air ship or balloon fabric material which is capable of assuming a standard airfoil configuration. In addition, this material is capable of stretching quite readily in one direction and relatively little in the other. Such a fabric, for example, tricot, is generally coated with an elastic, gas-retaining compound which may be light-stable, low-durometer polyurethane. While the resistance to stretch of the coated fabric will be greater and its maximum elongation will be less than prior to the coating, membranes 24, 26 and 28 are still sufficient for utilization within the instant invention. In general, the stretch axis of membranes 24, 26 and 28 run in the chordwise direction.

Situated within primary chamber 20 and as best shown in FIG. 5 of the drawing are a plurality of spanwise spars 30 (13 of which being shown in FIG. 5). Although any number of spanwise spars 30 may be utilized with this invention optimum results arise with utilization of between eight and fifteen such spars. Spars 30 are constructed of a lightweight, square weave cloth material of sufficient strength to maintain membranes or members 24 and 26 in the desired position. In addition, spars 30 are also porous to allow air to pass therethrough. Additional strength in provided to spars 30 by the use of lightweight cloth laces 31. Spars 30 stabilize chamber 20 during inflation and basically maintain the outer airfoil configuration of fin 16 by connection between the inner surfaces of lower and upper membranes 24 and 26, respectively.

Located above and secured to the outer surface of membrane 26 of primary chamber 20 is secondary or lift chamber 22 which contains therein a plurality of ribs 32. Ribs 32 are made of any suitable porous lightweight cloth material which runs in the chordwise direction between the inner surface of membrane 28 of chamber 22 and the outer surface of membrane 26 of chamber 20. Chamber 22 is generally of a planform configuration being reduced in span to the trailing edge of airfoil 12 in order to increase the chamber radius of its inflated thickness. Reduction of this radius decreases the hoop tension which, in turn, decreases the steepness of its curvature, thus minimizing the discontinuity where it is attached to the outer surface of membrane 26 of primary chamber 20.

Generally chamber 22 is operated at a sufficiently lower pressure (3–5 inches, water-gauge) compared to chamber 20 (6—10 inches, water-gauge) in order for inflation thereof to take place upward rather than depressing the outer surface of membrane 26 of chamber 20. Chamber 22 may be supplied with air by any one of a plurality of conventional means, such as an electrical power fan (not shown) in conjunction with an electrically operated valve for pressure relief. Alternatively, as shown in FIG. 4, lift chamber 22 may be pressurized by means of a conventional electrically operated valve 34 in membrane 26 of chamber 20, using empennage air pressure which will always be greater than the pressure in chamber 22, as set forth hereinabove. Depressurization of chamber 22 is effected by a conventional electrically operated valve 36 located in membrane 28 of chamber 22. Both valves 34 and 36, respectively, may be governed by a pitch-error signal such as from a vertical gyro on balloon 10 and thus automatically driven to variably control the degree of inflation of chamber 22 which, in turn will stabilize the pitch attitude of balloon 10 at some desirable low, positive angle for any wind velocity.

During operation, main or primary chamber 20 is independently pressurized by any conventional pressurization system 38 which may be located within body 19 of tethered balloon 10. Pressurization system 38 continually supplies chamber 20 with sufficient air pressure to maintain a constant inflated airfoil configuration within chamber 20. As set forth hereinabove this air pressure, by way of valve 34, may also be utilized to inflate chamber 22 when desired.

Airfoil 12 with the incorporation therein of inflatable fins 16 having chambers 20 and 22, utilizes chamber 22 to add correctly proportioned thickness to the upper side of horizontal fin 16 and thus provides lift at zero angle-of-attack and increases induced lift at positive angle-of-attack. Chamber 22 has its shape in thickness defined by members 26 and 28 and its expansion limited by the plurality of ribs 32 which run between the outer surface or member 26 of chamber 20 and the inner surface of member 28 of chamber 22 in the chordwise direction. At less than full inflation of chamber 22 the shape of chamber 22 as well as its surface smoothness is conferred upon it by the fabric used for member or membrane 28 of chamber 22. The variable lift airfoil 12 of the instant invention when utilized for horizontal fins 16 will therefore permit tethered aeroform balloon 10 to fly near zero pitch attitude for any wind velocity.

Although this invention has been described with reference to a particular embodiment it will be understood to those skilled in the art that this invention is also capable of a variety of alternate embodiments within the spirit and scope of the appended claims.

I claim:

1. In a tethered balloon having a body and an inflatable airfoil structure mounted on said body, the improvement residing in said inflatable airfoil structure, said airfoil structure comprising at least one inflatable horizontal fin, said fin being made up of a primary and a secondary chamber, said primary chamber being defined by a pair of non-rigid, gas retaining membranes and a plurality of supporting elements mounted therein, each of said supporting elements being secured between the inner surfaces of said pair of membranes in the spanwise direction, said secondary chamber being mounted on said primary chamber, said secondary chamber being defined by the outer surface of one of said membranes of said primary chamber, another non-rigid, gas retaining membrane and a plurality of supporting elements mounted therein, each of said supporting elements of said secondary chamber being secured between the outer surface of one of said membranes of said primary chamber and the inner surface of said membrane of said secondary chamber, a pair of valves, one of said valves being located within one of said membranes of said primary chamber and the other of said valves being located within said membrane of said secondary chamber, said pair of valves regulating the flow of gas within said secondary chamber and means operatively connected to said primary chamber for providing said primary chamber with a regulated flow of gas.

2. In a tethered balloon as defined in claim 1 wherein the pressure of said gas within said secondary chamber is less than the pressure of said gas within said primary chamber.

3. In a tethered balloon as defined in claim 2 wherein said membranes are made of a fabric material which is coated with an elastic, gas-retaining compound.

4. In a tethered balloon as defined in claim 3 wherein the stretch axis of said fabric membranes run in the chordwise direction.

5. In a tethered balloon as defined in claim 4 wherein said secondary chamber is of a substantially planform configuration being reduced in span to the trailing edge of said airfoil structure.

6. In a tethered balloon as defined in claim 5 wherein said one valve allows a regulated flow of gas to pass from said primary chamber into said secondary chamber.

7. In a tethered balloon as defined in claim 6 wherein said other of said valves allows a regulated flow of gas to flow from said secondary chamber to the atmosphere.

* * * * *